United States Patent Office 3,227,742
Patented Jan. 4, 1966

3,227,742
METHYL AND ETHYL ESTERS OF CYCLODO-
DECANOIC AND CYCLOUNDECANOIC ACID
Pierre Lafont, Lyon, and Yannik Bonnet, Tassin la Demi-
Lune, Rhone, France, assignors to Rhone-Poulenc S.A.,
Paris, France
No Drawing. Filed June 5, 1963, Ser. No. 285,567
Claims priority, application France, May 6, 1960, 826,436;
July 27, 1960, 834,137; Jan. 11, 1961, 849,401, Patent
1,286,709
4 Claims. (Cl. 260—468)

This application is a continuation-in-part of our applications Nos. 106,502, filed May 1, 1961, and 164,648, filed January 4, 1962, both now abandoned.

This invention relates to cycloaliphatic carboxylic acids having eleven and twelve carbon atoms in the cycloaliphatic ring.

According to a first feature of this invention, there are provided, as new chemical compounds, cycloundecanecarboxylic acid, a liquid boiling at 118° C. under 0.06 mm. Hg, and cyclododecanecarboxylic acid.

Cycloundecanecarboxylic acid possesses interesting choleretic activity. It may be esterified by methods of esterification known per se by means of aliphatic or aromatic alcohols free from functional groups to give products of high boiling point which can be used as plasticisers for vinylic and cellulosic polymers. Some of these esters, and in particular the methyl and ethyl esters, have, with a rose characteristic, a very persistent woody and fruity odour, which makes them interesting for the preparation of perfumes.

Cyclodoecanecarboxylic acid may be esterified with aliphatic or armoatic alcohols free from functional groups to give products of high melting point which can be used as plasticisers for vinyl and cellulosic polymers. In addition, some of these esters have a pleasant odour. For example, the methyl ester has a spicy and peppery tang which can be used in the composition of perfumes. It may also be converted into dodecanolactam which in turn may be converted into polyamide. The conversion of the acid into the lactam is effected by the action of a nitrosating agent in acid medium followed by hydrolysis of the product obtained, and finally treatment with an alkaline compound, more especially an alkali metal derivative.

These odoriferous lower alkyl esters of cycloundecane carboxylic acid and cyclododecane carboxylic acid may be represented by the structural formula:

wherein Q is a radical of the group consisting of cycloundecyl and cyclododecyl,
and R is an alkyl group of 1–2 carbon atoms.

It is known that by the action of alcoholic solutions of alkali hydroxides or of alcoholates on certain α-halogenated cyclanones, carboxylic acids are obtained of which the ring contains one carbon atom less than the initial ring, and there are simultaneously obtained cyclic ketones, hydroxylated or alklated in the 2-position, and epoxides. The best carboxylic acid yields have hitherto been obtained by using alkali alcoholates. For example cyclononanecarboxylic acid is obtained in a yield of 66% by treating 2-bromocyclodecanone with sodium methoxide in diethyl ether [Schenker and Prelog, Helv. Chim. Acta, vol. 36, pp. 896–900 (1953)].

It has now been found that whilst, if alkali alcoholates are reacted with 2-halogenocyclododecanones only a very small cycloundecanecarboxylic acid is obtained, together with a large amount of 2-alkoxycyclododecanone, yet if the alkali hydroxides are employed in homologous alcoholic medium or in a mixture of water and a water-miscible organic solvent for the halogenocyclododecanone, cycloundecanecarboxylic acid is obtained in yields higher than 80% with only small quantities of 2-hydroxycyclododecanone when the alkali hydroxide is in a medium containing water, or of 2-alkoxycyclododecanone when the alkali hydroxide is in an alcoholic medium.

According to the present invention therefore, a process for the preparation of cycloundencane carboxylic acid comprises reacting a 2-halogenocyclododecanone with an alkali hydroxide in a medium selected from the homologus aliphatic alcohols and mixtures of water and a water-miscible solvent for the halogenocyclododecanone, and acidifying the reaction mass.

The halogenocyclododecanone employed as starting material is preferably 2-chlorocyclododecanone or 2-bromocyclododecanone. The starting materials, i.e. the 2-halogenocyclododecanones, are new compounds readily obtained in excellent yields by halogenation, at a temperature of 18–22° C., of cyclododecanone in solution in an organic solvent such as benzene, ether or chloroform. The halogenation is limited to the monohalogenoketone stage by introducing exactly the theoretical quantity of halogen.

In carrying out the process of the invention, it is preferred to use, as the alkali hydroxide, potassium hydroxide or sodium hydroxide in the form of tablets which are dissolved either in an aliphatic alcohol such as ethanol, propanol or their higher homologues, or in a mixture of water and an organic solvent for the halogenocyclododecanone which is miscible with water, for example dioxan, tetrahydrofuran or methylal.

It is preferred that methanol should not be used as the aliphatic alcohol because it tends to form an alkali methoxide with the alkali hydroxide and in consequence 2-alkoxycyclododecanones are otbained as substantial products at the expense of some of the desired cycloundecanecarboxylic acid.

In the reaction of the 2-halogenocyclododecanone with the alkali hydroxide, it is desirable to use an excess of the latter—for example from 3 to 8 moles per mole of halogenocyclododecanone, and gradually to add the halogenocyclododecanone to the excess of alkali hydroxide solution. In the preferred method of carrying out the process, a solution of potassium hydroxide or of sodium hydroxide in ethanol (or higher homologue) or in an aqueous organic medium such as that defined above is prepared, and there is added thereto, drop by drop, a solution of the halogenocyclododecanone in the same solvent as is used to dissolve the alkali hydroxide or in a solvent of similar class.

The operation is carried out with vigorous stirring in the cold or at elevated temperature, e.g. at the reflux temperature of the reactants. Dehalohydration rapidly sets in, a reaction period of from 1 to 2 hours being sufficient when the operation is carried out at boiling point. On completion of the reaction, the alcohol or the organic solvent is distilled off and, preferably after the addition of water in cases where the operation has been carried out in the presence of alcohol, the neutral fraction consisting of 2-hydroxy(or 2-alkoxy)cyclododecanone is extracted with the aid of an appropriate solvent, for example diethyl ether. By acidification of the aqueous fraction, extraction of the latter with diethyl ether and elimination of this solvent, the cycloundecanecarboxylic acid is thus obtained in excellent yield.

According to a further feature of the invention a process for the production of the cyclododecane carboxylic acid comprises reacting the sodium derivative of cyclododecanone with ethyl carbonate thereby to produce ethyl 2-oxocyclododecane carboxylate, subjecting the product to treatment with an alkali metal borohydride in the presence of an alkali metal hydroxide, dehydrating the isomeric 2-hydroxycyclododecane carboxylic acids obtained, and subjecting to hydrogenation the cyclododecene carboxylic acids thus obtained.

It will be noted that cyclododecane carboxylic acid may thus be prepared from cyclododecanone, which is a readily obtainable starting material, by a series of stages which can be diagrammatically represented as follows:

Cyclododecanone→ethyl 2 - oxocyclododecane - carboxylate→isomeric 2 - hydroxycyclododecane - carboxylic acids→isomeric cyclododec-1-ene-carboxylic and cyclododec-2-ene-carboxylic acids→cyclododecane - carboxylic acid.

In carrying out the process of the invention, ethyl 2-oxo cyclododecane-carboxylate may be obtained by heating under reflux for one to several hours cyclododecanone and sodamide in the presence of anhydrous diethyl ether and then treating the sodium-containing cyclododecanone obtained with ethyl carbonate.

The resulting cyclanic betakeoester may then be simultaneously reduced and saponified to form 2-hydroxycyclododecane carboxylic acid by reaction at room temperature for several hours with potassium borohydride in the presence of an alkali hydroxide. A mixture of the two cis and trans isomeric forms of the acid is thus obtained.

The mixture of isomeric acids may be distilled to dryness under reduced pressure in the presence of 2% to 5% by weight of a dehydration catalyst such as para-toluenesulphonic acid. A mixture is obtained which contains a little cis and trans cyclododecene, the two isomeric cyclododec-2-ene carboxylic acids, and a cyclododec-1-ene carboxylic acid, which is crystallisable, melts at 121° C. and exhibits a considerable depression of its melting point when mixed with the already known cyclododec-1-ene carboxylic acid, M.P. 127° C. [H. Normant, Bull. Soc. Chim., p. 1427 (July 1960)].

The cyclododec-1-ene carboxylic acid of melting point 121° C. and/or the mixture of isomeric cyclododec-2-ene carboxylic acids is or are then hydrogenated by known methods, e.g. in the presence of Raney nickel as catalyst, to form cyclododecane carboxylic acid.

The following examples will serve to illustrate the invention.

*Example I*

Into a spherical three-necked 500 cc. flask provided with a central stirrer, a condenser and a supply funnel is run a solution of 14 g. of potassium hydroxide in 140 cc. of ethanol, and the mixture is boiled. A solution of 13.05 g. (0.05 mole) of 2-bromocyclododecanone in 50 cc. of ethanol is thereafter added in half an hour with good stirring. An abundant precipitate of potassium bromide forms. After refluxing for a further hour, the ethanol is distilled off. Water and diethyl ether are then introduced and the neutral fraction is extracted with diethyl ether. From the ethereal solution thus obtained, there is then extracted 1.7 g. of neutral product consisting of 2-ethoxy-cyclododecanone, B.P. 83° C. under 0.03 mm. Hg, giving a 2:4-dinitrophenylhydrazone of M.P. 121–121.5° C. The aqueous fraction, freed from the neutral fraction, is acidified, and then extracted with diethyl ether. The ethereal solution thus obtained is dried over anhydrous sodium sulphate and the ether is driven off by distillation. There are thus obtained 8.2 g. of acid fraction (yield 83%) consisting of cycloundecanecarboxylic acid, which boils at 118° C. under 0.06 mm. Hg and gives an anilide melting at 149° C. and an amide melting at 175–176° C.

On esterification of this acid with methanol or ethanol by conventional methods, methyl cyclododecanecarboxylate, B.P. 79–80° C. under 0.15 mm. Hg, and ethyl cycloundecanecarboxylate, B.P. 85° C. under 0.05 mm. Hg, are respectively obtained.

When in the foregoing process the ethanol solution of potassium hydroxide is replaced by sodium alcoholate (1.3 g. of sodium dissolved in 80 cc. of anhydrous methanol) there is obtained, from 13.05 g. of 2-bromo-cyclododecanone, 8.6 g. of 2-methxoycyclododecanone M.P. 56° C. and only 330 mg. of cycloundecanecarboxylic acid.

The 2-bromocyclododecanone employed as starting material is prepared as follows:

Into a three-necked 1-litre spherical flask provided with a central stirrer, a condenser and a supply funnel are run 12.8 g. of cyclododecanone (i.e. 0.4 mole) and 500 cc. of dry diethyl ether. Bromine (24 cc. i.e. 0.4 mole) is added drop by drop at 20–25° C. in one and a half hours, and the mixture is then stirred for a further hour. The ethereal solution thus obtained is then twice washed with 200 cc. of water and then dried over anhydrous sodium sulphate, and all the ether is evaporated. The oil obtained is dissolved at 40° C. in 200 cc. of petroleum ether. On cooling, there separate in the form of crystals 86 g. of 2-bromocyclododecanone, M.P. 53.5° C. (yield 85%), giving a 2:4-dinitrophenylhydrazone, M.P. 174° C.

*Example II*

By proceeding as in Example I, but dissolving the 14 g. of potassium hydroxide in 60 cc. of water and 60 cc. of dioxan (instead of 140 cc. of ethanol) and the 13.05 g. of 2-bromocyclododecanone in 50 cc. of dioxan (instead of ethanol), there are obtained 6.8 g. of cycloundecanecarboxylic acid (i.e. 68%) in addition to 3.2 g. of 2-hydroxycyclododecanone, which compound has already been described by Prelog [Helv. Chim. Acta 30, 1741 (1947)].

*Example III*

Into a three-necked 500 cc. spherical flask provided with a lateral stirrer, a condenser and a supply funnel is run a solution of 10 g. of potassium hydroxide in 100 cc. of ethanol, and the mixture is brought to boiling point. A solution of 10 g. of 2-chlorocyclododecanone in 500 cc. of ethanol is then added in half an hour with stirring. An abundant precipitate of potassium chloride forms. The mixture is left under reflux for a further hour and the ethanol is then distilled off. Water and diethyl ether are then added and the neutral fraction is extracted with diethyl ether. From the ethereal solution thus obtained there are extracted 1.8 g. of neutral product consisting of 2-ethoxycyclododecanone, B.P. 83° C. under 0.03 mm. Hg.

The aqueous fraction, freed from the neutral fraction, is acidified and then extracted with diethyl ether. The ethereal solution thus obtained is dried over anhydrous calcium sulphate and the ether is driven off by distillation. There are thus obtained 6.8 g. of acid fraction (yield 75%) consisting of cycloundecanecarboxylic acid identical to that obtained in Example I.

When in the foregoing process the ethanol solution of potassium hydroxide is replaced by sodium alcoholate (1.3 g. of sodium dissolved in 80 cc. of anhydrous methanol) there is obtained, from 10.8 g. of 2-chloro-dodecanone, 8.3 g. of 2-methoxycyclododecanone and only 200 mg. of cycloundecanecarboxylic acid.

The 2-chlorocyclododecanone employed as starting material is prepared from cyclododecanone in the same way as the 2-bromocyclododecanone in the method described at the end of Example I. 2-chlorocyclododecanone melts at 53° C. and gives a 2:4-dinitrophenylhydrazone, M.P. 182° C.

*Example IV*

(a) Into a 3-litre spherical flask provided with a condenser, a supply funnel and a stirrer are introduced 100 g. of sodamide and 500 cc. of anhydrous diethyl ether, and a solution of 364 g. (2 moles) of cyclododecanone in 650 cc. of ether is then run in with stirring over a period of 2 hours. The mixture is thereafter heated under reflux for two and a half hours, the heating is then stopped and 472 g. of ethyl carbonate are run in over a period of one hour. The mixture is then heated under reflux for two hours with stirring and is left overnight in the cold, the stirring being maintained. The compact mass obtained is hydrolysed by treatment with a mixture of 100 cc. of glacial acetic acid and about 300 g. of crushed ice. The product is extracted with diethyl ether and the ethereal extract is washed with an aqueous 20% sodium bicarbonate solution and then twice with water. The washed extract is thereafter dried over anhydrous sodium sulphate, the ether is then distilled off at normal pressure and the excess of ethyl carbonate is distilled off in vacuo (42–45° C. under 30 mm. Hg). There thus remains 499 g. of a product which is distilled under a high vacuum. A middle fraction of 420 g. is obtained, which boils at 125–126° C. under 0.2 mm. Hg and which consists of ethyl 2-oxocyclododecanecarboxylate.

(b) Into a 3-litre spherical flask provided with a condenser, a supply funnel and a stirrer are introduced 112 g. of potassium hydroxide and 800 cc. of water, the temperature being maintained at 10–15° C. A solution of 125 g. of ethyl 2-oxocyclododecane-carboxylate in 1000 cc. of methanol is thereafter poured in with stirring, and then a solution of 27 g. of potassium borohydride in 200 cc. of water is added. The stirring is maintained for 40 hours at room temperature and the product is then boiled to remove the greater part of the methanol. The product is cooled, the neutral fraction is extracted with diethyl ether and the aqueous layer is decanted and acidified with dilute hydrochloric acid to a pH of 3. The product is extracted with ether, washed with water and dried over sodium sulphate and the ether is then evaporated. The acid fraction obtained, which weighs 82 g. (i.e. about 72% yield) crystallises in a mass on cooling. The product, which melts in stages starting from 111° C., consists of a mixture of the cis and trans isomers of 2-hydroxycyclododecane carboxylic acid.

(c) Into a 250 cc. spherical flask provided with a lateral branch are introduced 82 g. of the mixture of 2-hydroxycyclododecane carboxylic acids previously obtained and 2 g. of para-toluenesulphonic acid. The crystalline mass is melted, a nitrogen supply capillary is introduced into the tube of the flask, and the flask is then gradually heated by a flame under reduced pressure (25 to 30 mm. Hg). There are thus condensed 66 g. of a mixture of water and organic products. 200 cc. of benzene are added to this mixture, the water is decanted and the acid fraction is extracted with sodium carbonate.

The fraction soluble in sodium carbonate is acidified and then in turn extracted with benzene. After washing, drying and evaporation of the solvent, the benzenic extract yields 46 g. of product which, on crystallisation from a 50/50 mixture of benzene and petroleum ether (fraction boiling 50–80° C.) gives 25 g. of crystals melting at 115° C. On being again recrystallised from a mixture of benzene and petroleum ether, this product gives 21.5 g. of cyclododec-1-ene carboxylic acid, M.P. 121–121.5° C., which is an isomer of the acid having a melting point of 127° C., described by H. Normant [Bull. Soc. Chim., p. 1424–27 (July 1960)].

The mother solution obtained after partial crystallisation of the 46 g. of benzenic extract is heated to evaporate the solvent and the residual oil is then distilled under 0.5 mm. Hg. There is thus obtained 20.5 g. of a fraction which distils between 125° and 140° C. and which, on infra-red spectrographic examination, is found to be a mixture of the two isomeric cyclododec-2-ene-carboxylic acids.

*Example V*

16 g. of the oily mixture of cyclododec-2-ene carboxylic acids obtained as described in Example IV are dissolved in 50 cc. of ethanol, and 50 cc. of 10% aqueous potassium hydroxide solution are added thereto.

There is thus obtained an aqueous alcoholic solution of the potassium salt of these acids, which is introduced into an 0.5 litre autoclave with 10 g. of Raney nickel. Hydrogen is introduced under pressure until a pressure of 50 kg./cm.$^2$ is set up in the autoclave and the mixture is then heated at 90° C. with stirring for 7 hours.

By acidification of the reaction mass and extraction with diethyl ether, there is isolated 14.5 g. of a product which readily crystallises from a 50/50 mixture of diethyl ether and petroleum ether (fraction boiling 35–50° C.). On recrystallisation from the same mixture, it yields 12 g. of cyclododecane carboxylic acid, M.P. 98° C.

This acid gives, on esterification, a methyl ester having a pleasant odour, which melts at 26° C. and boils at 98° C. under 0.15 mm. Hg.

By hydrogenating cyclododec-1-ene carboxylic acid, M.P. 121° C., under the same conditions, there is also obtained the same cyclododecane carboxylic acid.

We claim:
1. A compound of the formula

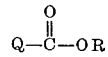

wherein Q is a radical of the group consisting of cycloundecyl and cyclododecyl,
and R is an alkyl group of 1–2 carbon atoms.
2. Methyl cycloundecanecarboxylate.
3. Ethyl cycloundecanecarboxylate.
4. Methyl cyclododecanecarboxylate.

References Cited by the Examiner

UNITED STATES PATENTS 2,878,257 3/1959 Moell et al. _____ 260—514 XR
3,089,904 5/1963 Lippincott et al. _____ 260—514

FOREIGN PATENTS 1,072,988 1/1960 Germany.

OTHER REFERENCES

Braude et al.: "Chem. Acstracts," vol. 52, pp. 1775b.
Ruzicka et al.. "Chem. Abstracts," vol. 45, p. 7024h.

LORRAINE A. WEINBERGER, *Primary Examiner.*

LEON ZITVER. *Examiner.*